United States Patent
Simmons

(10) Patent No.: US 9,354,740 B2
(45) Date of Patent: May 31, 2016

(54) OBJECT ORIENTATION DETERMINATION

(71) Applicant: Martin John Simmons, Whitely (GB)

(72) Inventor: Martin John Simmons, Whitely (GB)

(73) Assignee: Atmel Corporation, San Jose, CA (US)

( * ) Notice: Subject to any disclaimer, the term of this patent is extended or adjusted under 35 U.S.C. 154(b) by 237 days.

(21) Appl. No.: 14/061,338

(22) Filed: Oct. 23, 2013

(65) Prior Publication Data
US 2015/0109232 A1 Apr. 23, 2015

(51) Int. Cl.
*G06F 3/041* (2006.01)
*G06F 3/044* (2006.01)
*G06F 3/0488* (2013.01)

(52) U.S. Cl.
CPC .............. *G06F 3/0416* (2013.01); *G06F 3/044* (2013.01); *G06F 3/0488* (2013.01); *G06F 2203/0339* (2013.01); *G06F 2203/04101* (2013.01)

(58) Field of Classification Search
CPC ..... G06F 3/0416; G06F 3/044; G06F 3/0488; G06F 2203/0339; G06F 2203/04101
See application file for complete search history.

(56) References Cited

U.S. PATENT DOCUMENTS

| | | | |
|---|---|---|---|
| 7,663,607 B2 | 2/2010 | Hotelling | |
| 7,864,503 B2 | 1/2011 | Chang | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 8,217,902 B2 | 7/2012 | Chang | |
| 2008/0309635 A1 | 12/2008 | Matsuo | |
| 2009/0315854 A1 | 12/2009 | Matsuo | |
| 2010/0134423 A1* | 6/2010 | Brisebois et al. | 345/173 |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |
| 2013/0076612 A1 | 3/2013 | Myers | |
| 2013/0234982 A1* | 9/2013 | Kang | 345/174 |

FOREIGN PATENT DOCUMENTS

WO WO 2012/129247 A2 9/2012

OTHER PUBLICATIONS

Fletcher R. Rothkopf, U.S. Appl. No. 61/454,894, filed Mar. 21, 2011, Provisional Patent Application.
Scott A. Myers, U.S. Appl. No. 61/454,936, filed Mar. 21, 2011, Provisional Patent Application.
Stephen Brian Lynch, U.S. Appl. No. 61/454,950, filed Mar. 21, 2011, Provisional Patent Application.

* cited by examiner

*Primary Examiner* — Dorothy Harris
(74) *Attorney, Agent, or Firm* — Baker Botts L.L.P.

(57) ABSTRACT

In one embodiment, a method includes receiving, from one or more touch sensors of a computing device, signals corresponding to one or more touch or proximity inputs occurring substantially simultaneously within a touch-sensitive area of each of the touch sensors. At least a portion of the touch-sensitive areas of at least one of the touch sensors is disposed substantially along an edge of the computing device. The method also includes determining, based on the signals, an orientation of an object causing the touch or proximity inputs; and initiating a pre-determined function of the computing device based at least in part on the orientation of the object.

20 Claims, 6 Drawing Sheets

OBJECT ORIENTATION DETERMINATION

TECHNICAL FIELD

This disclosure generally relates to touch sensors.

BACKGROUND

A touch sensor may detect the presence and location of a touch or the proximity of an object (such as a user's finger or a stylus) within a touch-sensitive area of the touch sensor overlaid on a display screen, for example. In a touch-sensitive display application, the touch sensor may enable a user to interact directly with what is displayed on the screen, rather than indirectly with a mouse or touchpad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are different types of touch sensors, such as (for example) resistive touch screens, surface acoustic wave touch screens, and capacitive touch screens. Herein, reference to a touch sensor may encompass a touch screen, and vice versa, where appropriate. A capacitive touch screen may include an insulator coated with a substantially transparent conductor in a particular pattern. When an object touches or comes within proximity of the surface of the capacitive touch screen, a change in capacitance may occur within the touch screen at the location of the touch or proximity. A controller may process the change in capacitance to determine its position on the touch screen.

DESCRIPTION OF EXAMPLE EMBODIMENTS

Figure 1:
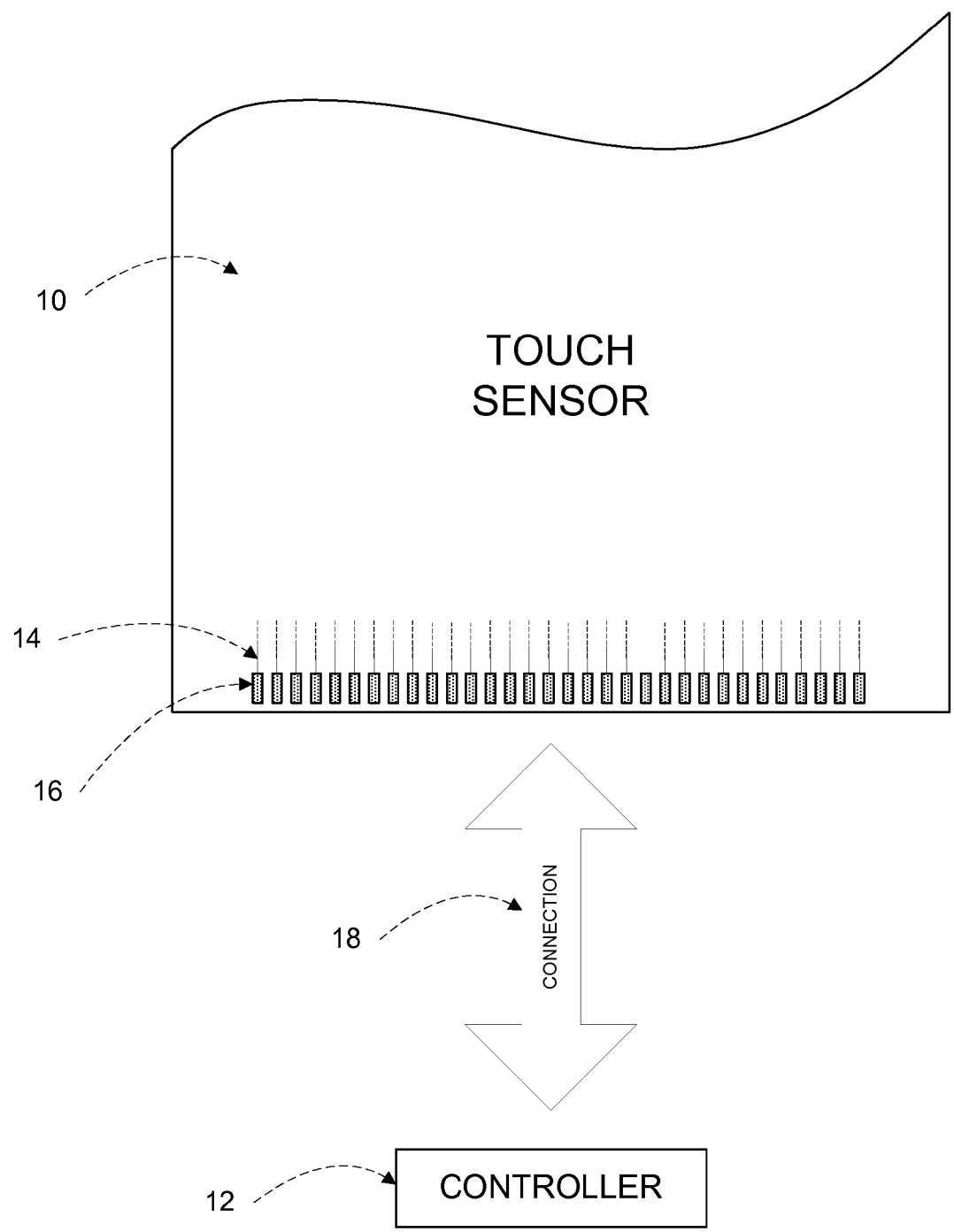
FIG. 1 illustrates example touch sensor with an example controller.

FIG. 1 illustrates an example touch sensor 10 with an example controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a drive electrode or a sense electrode) may be an area of conductive material forming a shape, such as for example a disc, square, rectangle, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape, where appropriate. In particular embodiments, the conductive material of an electrode may occupy substantially less than 100% of the area of its shape. As an example and not by way of limitation, an electrode may be made of fine lines of metal or other conductive material (such as for example copper, silver, or a copper- or silver-based material) and the fine lines of conductive material may occupy substantially less than 100% of the area of its shape in a hatched, mesh, or other suitable pattern. Although this disclosure describes or illustrates particular electrodes made of particular conductive material forming particular shapes with particular fills having particular patterns, this disclosure contemplates any suitable electrodes made of any suitable conductive material forming any suitable shapes with any suitable fills having any suitable patterns. Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 millimeter (mm); the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 microns ($\mu m$) or less and a width of approximately 10 $\mu m$ or less. As another example, one or more portions of the conductive material may be silver or silver-based and similarly have a thickness of approximately 5 $\mu m$ or less and a width of approximately 10 $\mu m$ or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs) or digital signal processors (DSPs)) of a device that includes touch sensor 10 and touch-sensor controller 12, which may respond to the touch or proximity input by initiating a function of the device (or an application running on the device) associated with it. Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2:
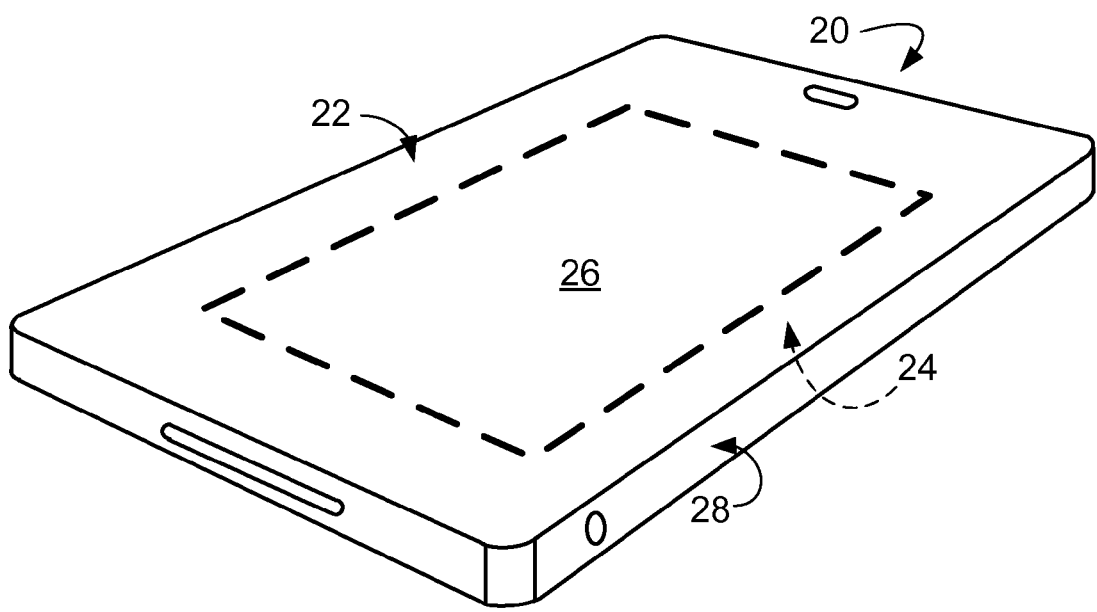
FIG. 2 illustrates an example computing device with the example controller and touch sensor of FIG. 1.

FIG. 2 illustrates an example computing device with the example controller and touch sensor of FIG. 1. As an example and not by way of limitation, computing device 20 may include a smartphone, a personal-digital assistant (PDA), a tablet computer, a laptop computer, a desktop computer, a kiosk computer, a satellite navigation device, a portable media player, a portable game console, a point-of-sale device, another suitable device, a suitable combination of two or more of these, or a suitable portion of one or more of these. In the example of FIG. 2, computing device 20 includes one or more touch sensors, described above, that each have a touch-sensitive area (e.g. 26) proximate to a surface (e.g. a bottom surface 24) of computing device 20. Although this disclosure illustrates and describes a computing device with touch sensors having particularly shaped touch-sensitive areas proximate to particular surfaces of the computing device, this disclosure contemplates a computing device with touch sensors having any suitable combination of any suitably shaped touch-sensitive areas proximate to any suitable surface. In particular embodiments, computing device 20 may have a primary touch sensor with touch-sensitive area proximate top surface 22. As described above, the controller may process measurement signals to detect the presence and location of one or more touch or proximity inputs within touch-sensitive areas (e.g. 26). As an example and not by way of limitation, swiping or pinching gestures sensed within the touch-sensitive area proximate top surface 22 of computing device 20 may initiate one or more pre-determined functions such as moving an object between two points or zooming in on an image on a display of computing device 20. In particular embodiments, computing device 20 may include one or more touch sensors with one or more touch-sensitive areas 26 proximate with a bottom surface 24 or one or more touch-sensitive areas proximate to one or more side surfaces (e.g. 28), as described below.

Figure 3:
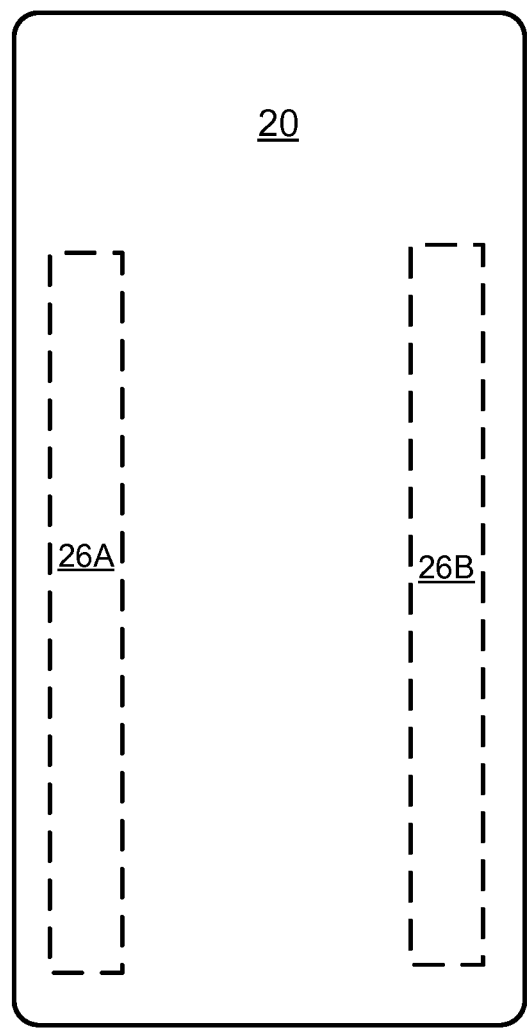
FIG. 3 illustrates a top view of an example device with an example secondary touch sensor.

FIG. 3 illustrates an example top view of an example computing device with example touch-sensitive areas proximate to the bottom surface. As described above, computing device 20 may include one or more secondary touch sensors that each have a touch-sensitive area 26A-B proximate to and corresponding to at least a portion of the bottom surface of computing device 20. As an example and not by way of limitation, one or more of the secondary touch sensors may be one-dimensional (1D) touch sensors disposed along and having touch-sensitive areas 26A-B corresponding to one or more edges of the bottom surface. In particular embodiments, the secondary touch sensors may include one or more 1D touch sensors disposed within and having touch-sensitive areas corresponding to a portion of the bottom surface of computing device 20 between touch-sensitive areas 20A-B. As another example, one or more of the secondary touch sensors may be a two-dimensional (2D) touch sensor disposed on and having a touch-sensitive area corresponding to at least a portion of the bottom surface. In particular embodiments, the secondary touch sensor may be an extension of the primary touch sensor. In particular embodiments, electrodes of the secondary touch sensors may be formed using a conductive optically opaque material that substantially fills its shape. As described above, the controller of computing device 20 may detect a touch or proximity input sensed within touch-sensitive areas 26A-B.

Figure 4:
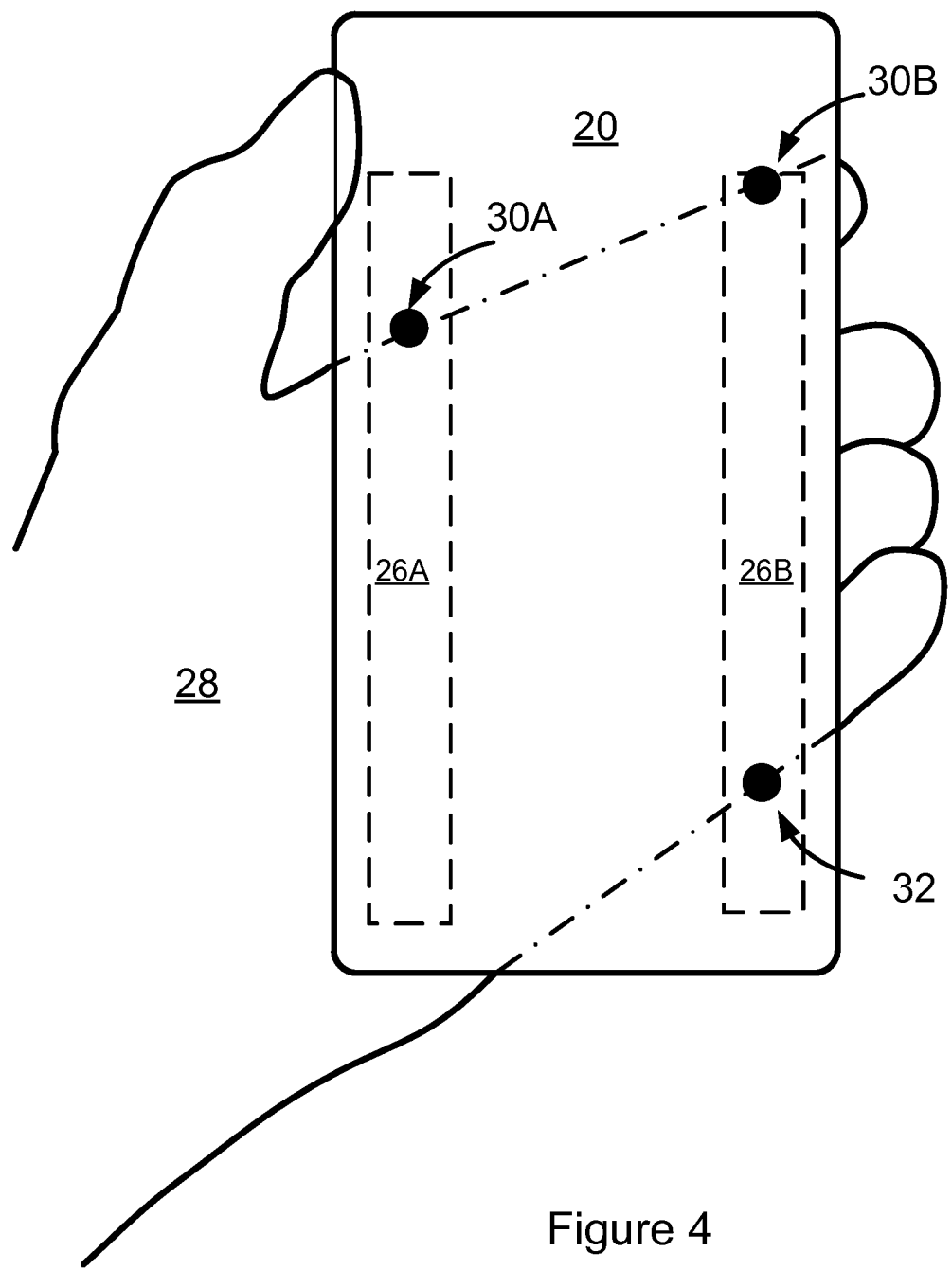
FIG. 4 illustrates an example determination of the orientation of an object causing an example touch input.

FIG. 4 illustrates an example orientation determination of an object causing a touch input on a surface of an example computing device. Although this disclosure illustrates and describes determining an orientation of an object causing a touch input through particular methods and particular configuration of touch sensors, this disclosure contemplates determining the orientation of an object causing a touch input through any suitable methods and any suitable configuration of touch sensors. In particular embodiments, the controller or other processor of computing device 20 may determine an orientation (e.g. slope) of a touch-input from an object 28, such as a hand, based at least in part on the location of the touch or proximity inputs within touch-sensitive areas 26A-B. As an example and not by way of limitation, the controller or other processor of computing device 20 may determine which hand is holding computing device 20 based at least in part on the orientation of the touch input occurring substantially simultaneously within touch-sensitive areas 26A-B. In the example of FIGS. 3-4, touch-sensitive areas 26A-B of one or more touch sensors disposed on the bottom surface of computing device 20 corresponds to a pair of opposing edges of the bottom surface. As an example and not by way of limitation, the controller of computing device 20 may determine the orientation of object 28 causing a touch or proximity input based on a difference in coverage of object 28 causing the touch input substantially simultaneously occurring within touch-sensitive area 26A of the secondary touch sensor on one edge and touch-sensitive area 26B of the secondary touch sensor on the opposing edge of the bottom surface of computing device 20. In particular embodiments, the controller of computing device 20 may interpolate the signals corresponding to a touch or proximity input to infer a top and bottom of a hand holding computing device 20. For example, the controller of computing device 20 may determine a upward orientation or slope from left to right based at least in part on a point corresponding to an absence of a touch input within an upper portion of touch-sensitive areas 26A-B. In particular embodiments, the orientation of object 28 causing the touch or proximity input may be determined from the top of the touch or proximity input through interpolation of a line between a point 30A-B of a top boundary of each touch sensitive area 26A-B, respectively, that includes the touch or proximity input. The orientation of object 28 causing the touch or proximity input may be similarly determined through interpolation of a line between a point (e.g. 32) of a bottom boundary of each touch sensitive area 26A-B that includes the touch or proximity input. In particular embodiments, the controller of computing device 20 may infer computing device 20 is being held in the left hand of a user based on the upward orientation of object the touch input. Conversely, the controller of computing device 20 may infer computing device 20 is being held in the right hand of the user based on an upward orientation or slope of the touch input from right to left. In particular embodiments, the upward orientation associated with the left hand may correspond to a positive slope of the interpolated line and the upward orientation associated with the right hand may correspond to a negative slope of the interpolated line. As another example, the controller of computing device 20 may determine the orientation of object 28 causing the touch input based at least in part on a difference in coverage of the touch input sensed within touch-sensitive areas corresponding to opposing side surfaces of computing device 20 described above or any suitable combination of touch sensitive areas 26A-B disposed on the bottom surface and touch-sensitive areas of one or more of the side surfaces.

In particular embodiments, the controller of computing device 20 may identify the orientation of object 28 causing a touch or proximity input based at least in part on substantially simultaneously occurring in touch-sensitive areas 26A-B. As an example and not by way of limitation, the controller may determine the orientation of object 28 causing the touch-input based on sensing a touch or proximity input at least within both touch-sensitive areas 26A-B during a scan period (e.g. an amount of time the touch sensor measures signals corresponding to a touch input) associated with the secondary touch sensors. As described above, the controller of computing device 20 may initiate one or more pre-determined functions based at least in part on the determination of the orientation of object 28 causing the touch input occurring substantially simultaneously within touch-sensitive areas 26A-B. As an example and not by way of limitation, the operating system (OS) of computing device 20 may modify a graphical user interface (GUI) of computing device 20 based at least in part on inferring which hand of the user is holding computing device 20. For example, the OS of computing device 20 may modify an arrangement of interactive elements (e.g. icons) of the GUI based at least part on inferring which hand of the user is holding computing device 20. Although this disclosure describes executing particular functions associated with inferring an orientation of the object causing a touch or proximity input, this disclosure contemplates execution of any suitable function or any combination thereof by the computing device.

Figure 5:
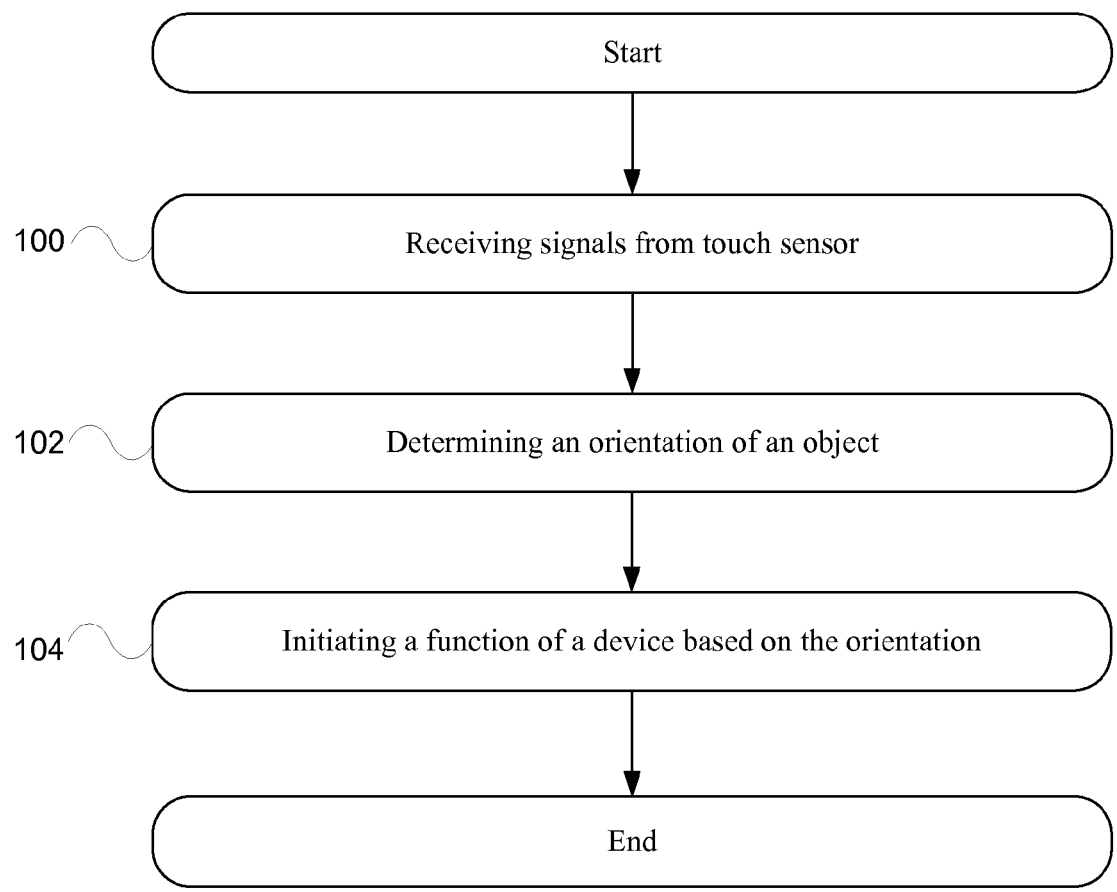
FIG. 5 illustrates an example method for initiating a predetermined function of a device.

FIG. 5 illustrates an example method for initiating a pre-determined function of a device. The method starts at step 100, where a computing device receives signals that correspond to one or more touch or proximity inputs occurring substantially simultaneously within a touch-sensitive area of one or more touch sensors. In particular embodiments, at least a portion of the touch-sensitive areas of at least one of the touch sensors is disposed substantially along an edge of the computing device, as described above. Step 102 an orientation of an object causing the touch or proximity inputs is determined by the computing device based on the signals. In particular embodiments, the determination may be based on interpolating a line that at least includes a point of a top or bottom boundary of each touch-sensitive area that includes the touch input. In particular embodiments, the determination is further based on a slope of the interpolated line. At step 104, a pre-determined function of the computing device may be initiated based at least in part on the orientation of the object, at which point the method may end. In particular embodiments, the pre-determined function may be modifying an arrangement of interactive elements of a GUI of the computing device. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for initiating a pre-determined function of a device including the particular steps of the method of FIG. 5, this disclosure contemplates any suitable method for initiating a pre-determined function of a device including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
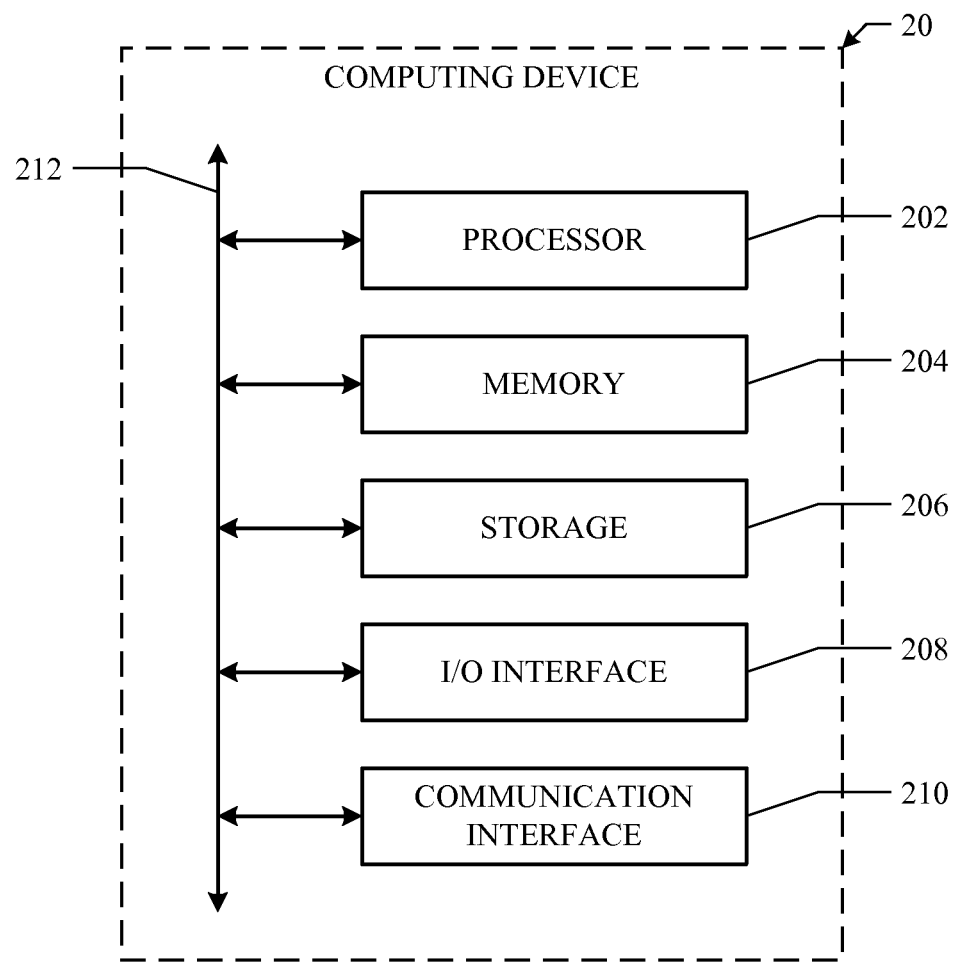
FIG. 6 illustrates an example computing device.

FIG. 6 illustrates an example computing device. In particular embodiments, one or more computer devices 20 perform one or more steps of one or more methods described or illustrated herein. In particular embodiments, one or more computer devices 20 provide functionality described or illustrated herein. In particular embodiments, software running on one or more computing devices 20 performs one or more steps of one or more methods described or illustrated herein or provides functionality described or illustrated herein. Particular embodiments include one or more portions of one or more computing devices 20. Herein, reference to a computer system may encompass a computing device, and vice versa, where appropriate. Moreover, reference to a computer system may encompass one or more computer systems, where appropriate.

This disclosure contemplates any suitable number of computing devices 20. This disclosure contemplates computing devices 20 taking any suitable physical form. As example and not by way of limitation, computing devices 20 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, a computer system may include one or more computer devices 20; be unitary or distributed; span multiple locations; span multiple machines; span multiple data centers; or reside in a cloud, which may include one or more cloud components in one or more networks. Where appropriate, one or more computing device 20 may perform without substantial spatial or temporal limitation one or more steps of one or more methods described or illustrated herein. As an example and not by way of limitation, one or more computing devices 20 may perform in real time or in batch mode one or more steps of one or more methods described or illustrated herein. One or more computing devices 20 may perform at different times or at different locations one or more steps of one or more methods described or illustrated herein, where appropriate.

In particular embodiments, computing device 20 includes a processor 202, memory 204, storage 206, an input/output (I/O) interface 208, a communication interface 210, and a bus 212. Although this disclosure describes and illustrates a particular computing device having a particular number of particular components in a particular arrangement, this disclosure contemplates any suitable computing device having any suitable number of any suitable components in any suitable arrangement.

In particular embodiments, processor 202 includes hardware for executing instructions, such as those making up a computer program or application. As an example and not by way of limitation, to execute instructions, processor 202 may retrieve (or fetch) the instructions from an internal register, an internal cache, memory 204, or storage 206; decode and execute them; and then write one or more results to an internal register, an internal cache, memory 204, or storage 206. In particular embodiments, processor 202 may include one or more internal caches for data, instructions, or addresses. This disclosure contemplates processor 202 including any suitable number of any suitable internal caches, where appropriate. As an example and not by way of limitation, processor 202 may include one or more instruction caches, one or more data caches, and one or more translation lookaside buffers (TLBs). Instructions in the instruction caches may be copies of instructions in memory 204 or storage 206, and the instruction caches may speed up retrieval of those instructions by processor 202. Data in the data caches may be copies of data in memory 204 or storage 206 for instructions executing at processor 202 to operate on; the results of previous instructions executed at processor 202 for access by subsequent instructions executing at processor 202 or for writing to memory 204 or storage 206; or other suitable data. The data caches may speed up read or write operations by processor 202. The TLBs may speed up virtual-address translation for processor 202. In particular embodiments, processor 202 may include one or more internal registers for data, instructions, or addresses. This disclosure contemplates processor 202 including any suitable number of any suitable internal registers, where appropriate. Where appropriate, processor 202 may include one or more arithmetic logic units (ALUs); be a multi-core processor; or include one or more processors 202. Although this disclosure describes and illustrates a particular processor, this disclosure contemplates any suitable processor.

In particular embodiments, memory 204 includes main memory for storing instructions for processor 202 to execute or data for processor 202 to operate on. As an example and not by way of limitation, computing device 20 may load instructions from storage 206 or another source (such as, for example, another computer system 200) to memory 204. Processor 202 may then load the instructions from memory 204 to an internal register or internal cache. To execute the instructions, processor 202 may retrieve the instructions from the internal register or internal cache and decode them. During or after execution of the instructions, processor 202 may write one or more results (which may be intermediate or final results) to the internal register or internal cache. Processor 202 may then write one or more of those results to memory 204. In particular embodiments, processor 202 executes only instructions in one or more internal registers or internal caches or in memory 204 (as opposed to storage 206 or elsewhere) and operates only on data in one or more internal registers or internal caches or in memory 204 (as opposed to storage 206 or elsewhere). One or more memory buses (which may each include an address bus and a data bus) may couple processor 202 to memory 204. Bus 212 may include one or more memory buses, as described below. In particular embodiments, one or more memory management units (MMUs) reside between processor 202 and memory 204 and facilitate accesses to memory 204 requested by processor 202. In particular embodiments, memory 204 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 204 may include one or more memories 204, where appropriate. Although this disclosure describes and illustrates particular memory, this disclosure contemplates any suitable memory.

In particular embodiments, storage 206 includes mass storage for data or instructions. As an example and not by way of limitation, storage 206 may include a hard disk drive (HDD), a floppy disk drive, flash memory, an optical disc, a magneto-optical disc, magnetic tape, or a Universal Serial Bus (USB) drive or a combination of two or more of these. Storage 206 may include removable or non-removable (or fixed) media, where appropriate. Storage 206 may be internal or external to computing device 20, where appropriate. In particular embodiments, storage 206 is non-volatile, solid-state memory. In particular embodiments, storage 206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 206 taking any suitable physical form. Storage 206 may include one or more storage control units facilitating communication between processor 202 and storage 206, where appropriate. Where appropriate, storage 206 may include one or more storages 206. Although this disclosure describes and illustrates particular storage, this disclosure contemplates any suitable storage.

In particular embodiments, I/O interface 208 includes hardware, software, or both, providing one or more interfaces for communication between computing device 20 and one or more I/O devices. Computing device 20 may include one or more of these I/O devices, where appropriate. One or more of these I/O devices may enable communication between a person and computing device 20. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 208 for them. Where appropriate, I/O interface 208 may include one or more device or software drivers enabling processor 202 to drive one or more of these I/O devices. I/O interface 208 may include one or more I/O interfaces 208, where appropriate. Although this disclosure describes and illustrates a particular I/O interface, this disclosure contemplates any suitable I/O interface.

In particular embodiments, communication interface 210 includes hardware, software, or both providing one or more interfaces for communication (such as, for example, packet-based communication) between computing device 20 and one or more other computing devices 20 or one or more networks. As an example and not by way of limitation, communication interface 210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 210 for it. As an example and not by way of limitation, computing devices 20 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computing devices 20 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computing device 20 may include any suitable communication interface 210 for any of these networks, where appropriate. Communication interface 210 may include one or more communication interfaces 210, where appropriate. Although this disclosure describes and illustrates a particular communication interface, this disclosure contemplates any suitable communication interface.

In particular embodiments, bus 212 includes hardware, software, or both coupling components of computing device 20 to each other. As an example and not by way of limitation, bus 212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 212 may include one or more buses 212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:
1. A method comprising:
  receiving, from one or more touch sensors of a computing device, signals corresponding to one or more touch or proximity inputs occurring substantially simultaneously within a touch-sensitive area of each of the touch sensors, at least a portion of the touch-sensitive areas of at least one of the touch sensors being disposed substan- tially along an edge of the computing device, wherein the signals correspond to a first point and a second point;
determining, based on the signals, an orientation of a hand causing the one or more touch or proximity inputs, wherein the determination comprises:
interpolating a line between the first point and the second point; and
determining a slope of the interpolated line, wherein the slope is a non-zero slope relative to an axis spanning a width of the computing device; and
initiating a pre-determined function of the computing device based at least in part on the orientation of the hand.

2. The method of claim 1, wherein:
the touch sensors comprise a plurality of one-dimensional (1D) touch sensors disposed substantially along a plurality of opposing edges of a bottom surface or a plurality of side surfaces of the computing device; and
the determination further comprises interpolating the line based on a spatial difference between a point of a top or a bottom boundary of each touch-sensitive area that includes the touch or proximity input to determine whether the hand is a right or a left hand holding the computing device.

3. The method of claim 2, at least one touch or proximity input of the one or more touch or proximity inputs comprises a plurality of signals.

4. The method of claim 2, further comprising inferring the computing device is being held with the right or left hand based at least in part on whether the slope of the interpolated line is positive or negative, wherein a positive slope corresponds to an upward orientation of the left hand and a negative slope corresponds to an upward orientation of the right hand.

5. The method of claim 1, wherein the pre-determined function comprises modifying an arrangement of interactive elements of a graphical user interface (GUI) of the computing device.

6. The method of claim 1, wherein one or more of the touch sensors comprises a touch sensor disposed between the edges of computing device.

7. The method of claim 1, wherein the touch sensors comprise a 1D touch sensor substantially disposed along a side surface of the computing device.

8. A computer-readable non-transitory storage medium embodying logic configured when executed to:
receive, from one or more touch sensors of a computing device, signals corresponding to one or more touch or proximity inputs occurring substantially simultaneously within a touch-sensitive area of each of the touch sensors, at least a portion of the touch-sensitive areas of at least one of the touch sensors being disposed substantially along an edge of the computing device, wherein the signals correspond to a first point and a second point;
determine, based on the signals, an orientation of a hand causing the one or more touch or proximity inputs, wherein the determination comprises:
interpolating a line between the first point and the second point; and
determining a slope of the interpolated line, wherein the slope is a non-zero slope relative to an axis spanning a width of the computing device; and
initiate a pre-determined function of the computing device based at least in part on the orientation of the hand.

9. The medium of claim 8, wherein:
the touch sensors comprise a plurality of one-dimensional (1D) touch sensors disposed substantially along a plurality of opposing edges of a bottom surface or a plurality of side surfaces of the computing device; and
the logic is further configured to interpolate the line based on a spatial difference between a point of a top or a bottom boundary of each touch-sensitive area that includes the touch or proximity input to determine whether the hand is a right or a left hand holding the computing device.

10. The medium of claim 9, wherein at least one touch or proximity input of the one or more touch or proximity inputs comprises a plurality of signals.

11. The medium of claim 9, wherein the logic is further configured to infer the computing device is being held with the right or left hand based at least in part on whether the slope of the interpolated line is positive or negative, a positive slope corresponding to an upward orientation of the left hand and a negative slope corresponding to an upward orientation of the right hand.

12. The medium of claim 8, wherein the pre-determined function comprises modifying an arrangement of interactive elements of a graphical user interface (GUI) of the computing device.

13. The medium of claim 8, wherein one or more of the touch sensors comprises a touch sensor disposed between the edges of computing device.

14. The medium of claim 8, wherein the touch sensors comprise a 1D touch sensor substantially disposed along a side surface of the computing device.

15. A device comprising:
one or more touch sensors; and
a computer-readable non-transitory storage medium coupled to the touch sensors and embodying logic configured when executed to:
receive, from the touch sensors of the device, signals corresponding to one or more touch or proximity inputs occurring substantially simultaneously within a touch-sensitive area of each of the touch sensors, at least a portion of the touch-sensitive areas of at least one of the touch sensors being disposed substantially along an edge of the device, wherein the signals correspond to a first point and a second point;
determine, based on the signals, an orientation of a hand causing the one or more touch or proximity inputs, wherein the determination comprises:
interpolating a line between the first point and the second point; and
determining a slope of the interpolated line, wherein the slope is a non-zero slope relative to an axis spanning a width of the computing device; and
initiate a pre-determined function of the device based at least in part on the orientation of the hand.

16. The device of claim 15, wherein:
the touch sensors comprise a plurality of one-dimensional (1D) touch sensors disposed substantially along a plurality of opposing edges of a bottom surface or a plurality of side surfaces of the device; and
the logic is further configured to interpolate the line based on a spatial difference between a point of a top or a bottom boundary of each touch-sensitive area that includes the touch or proximity input to determine whether the hand is a right or left hand holding the device.

17. The device of claim 16, wherein at least one touch or proximity input of the one or more touch or proximity inputs comprises a plurality of signals.

18. The device of claim 17, wherein the logic is further configured to infer the device is being held with the right or left hand based at least in part on whether the slope of the interpolated line is positive or negative, a positive slope corresponding to an upward orientation of the left hand and a negative slope corresponding to an upward orientation of the right hand.

19. The device of claim 15, wherein the pre-determined function comprises modifying an arrangement of interactive elements of a graphical user interface (GUI) of the device.

20. The device of claim 15, wherein one or more of the touch sensors comprises a touch sensor disposed between the edges of device.

* * * * *